US012479507B2

(12) United States Patent
Nylund et al.

(10) Patent No.: US 12,479,507 B2
(45) Date of Patent: Nov. 25, 2025

(54) SIDE STRUCTURE FOR A VEHICLE

(71) Applicant: Honda Motor Co., Ltd., Tokyo (JP)

(72) Inventors: Andreas Nylund, Marysville, OH (US); Cameron E. O'Keeffe, Dublin, OH (US); Christopher J. Mampe, Delaware, OH (US); Jorge E. Salgado Gomez, Marysville, OH (US); Jeffrey T. Sale, Columbus, OH (US); Steven R. Thiele, Marysville, OH (US); Nathan Roy, Marysville, OH (US); Craig M. Nichelson, Lima, OH (US)

(73) Assignee: Honda Motor Co., Ltd., Tokyo (JP)

( * ) Notice: Subject to any disclaimer, the term of this patent is extended or adjusted under 35 U.S.C. 154(b) by 382 days.

(21) Appl. No.: 18/298,126

(22) Filed: Apr. 10, 2023

(65) Prior Publication Data

US 2024/0336305 A1   Oct. 10, 2024

(51) Int. Cl.
*B62D 21/15* (2006.01)
*B60J 5/04* (2006.01)
*B62D 25/02* (2006.01)
*B62D 25/20* (2006.01)

(52) U.S. Cl.
CPC .......... *B62D 21/157* (2013.01); *B60J 5/0443* (2013.01); *B62D 25/025* (2013.01); *B62D 25/20* (2013.01)

(58) Field of Classification Search
CPC .... B62D 25/025; B62D 25/20; B62D 21/157; B60J 5/0443; B60J 5/0444; B60J 5/042; B60J 5/0456; B60J 5/0461
USPC .... 296/146.6, 209, 63, 68.1, 187.12, 193.07
See application file for complete search history.

(56) References Cited

U.S. PATENT DOCUMENTS

| 5,435,618 A  * | 7/1995 | Sacco ................ B62D 21/157 296/68.1 |
| 8,740,287 B2 | 6/2014 | Onda et al. |
| 9,701,182 B1 | 7/2017 | Hallman et al. |
| 9,815,352 B2 * | 11/2017 | Roehm ................. B60J 5/0444 |
| 10,967,912 B2 | 4/2021 | Toyota |
| 11,325,449 B2 | 5/2022 | Tabaru et al. |

(Continued)

FOREIGN PATENT DOCUMENTS

| CN | 103660877 B | 3/2017 |
| EP | 1790552 B1 | 9/2009 |
| JP | H0986178 A | 3/1997 |

(Continued)

OTHER PUBLICATIONS

JP4687365 Text (Year: 2011).*

*Primary Examiner* — Dennis H Pedder
(74) *Attorney, Agent, or Firm* — Suzanne Gagnon; American Honda Motor Co., Inc.

(57) ABSTRACT

A side structure for a vehicle includes a seat support structure arranged inside a vehicle body and coupled to a floor of the vehicle body, and a side sill arranged proximate to the floor of the vehicle body. A door is coupled to the vehicle body and includes a first end arranged proximate to the floor of the vehicle body and a second end arranged proximate to a top of the vehicle body. Moreover, the door includes a beam extending in a longitudinal direction of the door. A bracket is arranged inside the vehicle body and disposed between the seat support structure and the door in a lateral direction. The beam is configured to engage with the bracket during a deformation of the door.

20 Claims, 7 Drawing Sheets

(56) References Cited

U.S. PATENT DOCUMENTS

2009/0184501 A1     7/2009   Hirotani
2010/0225141 A1*   9/2010   Mori ...................... B60J 5/0437
                                                                             296/146.6

FOREIGN PATENT DOCUMENTS

| | | |
|---|---|---|
| JP | 4148195 B2 | 9/2008 |
| JP | 2008239106 A | 10/2008 |
| JP | 4687365 B2 * | 5/2011   ........... B60J 5/0429 |
| JP | 4978862 B2 | 7/2012 |
| JP | 5066738 B2 | 11/2012 |
| JP | 5314513 B2 | 10/2013 |
| JP | 2014020015 A | 2/2014 |
| JP | 2016084031 A | 5/2016 |
| JP | 2017214010 A | 12/2017 |

* cited by examiner

SIDE STRUCTURE FOR A VEHICLE

BACKGROUND

Vehicles may include a car body with a front portion that generally has a crushable zone to absorb energy during a front impact of the vehicle. However, during a side impact, a lower portion of the door of the vehicle deforms and disengages from the side sill of the vehicle. This causes an increased overall intrusion of the door into vehicle and reduces occupant space. Moreover, there is relatively reduced transfer of impact energy to the various components of the vehicle due to the disengagement of the lower portion of the door from the side sill.

SUMMARY

In accordance with one embodiment, a side structure for a vehicle having a vehicle body and a door coupled to the vehicle body is provided. The side structure includes a seat support structure arranged inside the vehicle body configured to support a seat and coupled to a floor of the vehicle body, and a side sill arranged proximate to the floor of the vehicle body. The side structure also includes a beam attached to the door and extending in the longitudinal direction of the door and arranged proximate to a lower end of the door in a vertical direction. The side structure also has a bracket arranged inside the vehicle body and disposed between the seat support structure and the door in a lateral direction and is supported on the side sill. The beam is configured to engage with the bracket during a deformation of the door.

In accordance with another embodiment, a vehicle includes a vehicle body having a floor, a roof, and defining at least one access opening at a side of the vehicle body. The vehicle also includes a seat support structure arranged inside the vehicle body and coupled to the floor of the vehicle body, and a side sill arranged proximate to the floor of the vehicle body. Moreover, the vehicle includes a door coupled to the vehicle body and adapted to selectively cover the access opening of the vehicle body. The door includes a first end arranged proximate to the floor of the vehicle body and a second end arranged proximate to a top of the vehicle body. The door also includes a first beam extending in the longitudinal direction of the door and arranged proximate to the first end of the door in a vertical direction. The vehicle also includes a bracket arranged inside the vehicle body and disposed between the seat support structure and the door in a lateral direction and is supported on the side sill. The first beam is configured to engage with the bracket during a deformation of the door.

In accordance with a further embodiment, a side structure for a vehicle having a vehicle body is provided. The side structure includes a seat support structure arranged inside the vehicle body and coupled to a floor of the vehicle body, and a side sill arranged proximate to the floor of the vehicle body. The side structure also includes a door coupled to the vehicle body having a first end arranged proximate to the floor of the vehicle body and a second end arranged proximate to a top of the vehicle body. The door includes a first beam extending in the longitudinal direction of the door and arranged proximate to the first end of the door in a vertical direction. The first beam includes a vertex portion arranged proximate to an inner side of the door and a base portion arranged proximate to an outer side of the door. The side structure also includes a bracket arranged inside the vehicle body and disposed between the seat support structure and the door in a lateral direction and is supported on the side sill. The first beam is configured to engage with the bracket during a deformation of the door.

BRIEF DESCRIPTION OF THE DRAWINGS

Certain embodiments of the present disclosure will be better understood from the following description taken in conjunction with the accompanying drawings in which.

DETAILED DESCRIPTION

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-7, wherein like numbers indicate the same or corresponding elements throughout the views.

Figure 1:
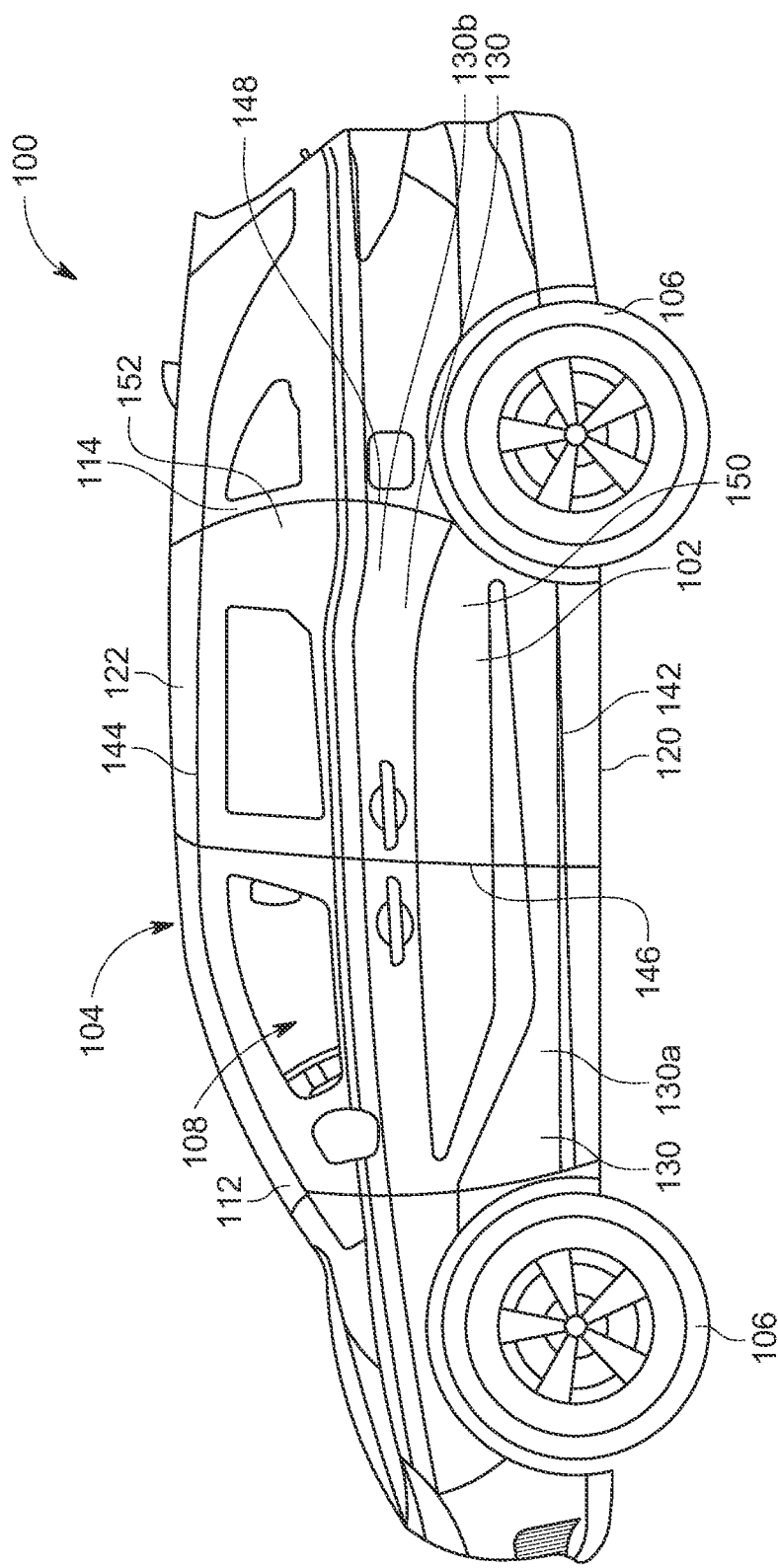
FIG. 1 is a side view depicting a vehicle, in accordance with one embodiment of the present disclosure.

FIG. 1 illustrates a side view of a vehicle, indicated generally at 100, in accordance with one embodiment of the present disclosure. The vehicle 100 is shown as a car having a sliding rear door 102. However, vehicle 100 in accordance with alternative embodiments can comprise any variety of vehicles, including trucks, vans, recreational vehicles, utility vehicles, agricultural equipment, or construction equipment, for example. The vehicle 100 includes a vehicle body 104 to which various components of the vehicle 100 are mounted, and a plurality of traction members, for example, wheels 106, movably support the vehicle body 104 on a surface.

Figure 2:
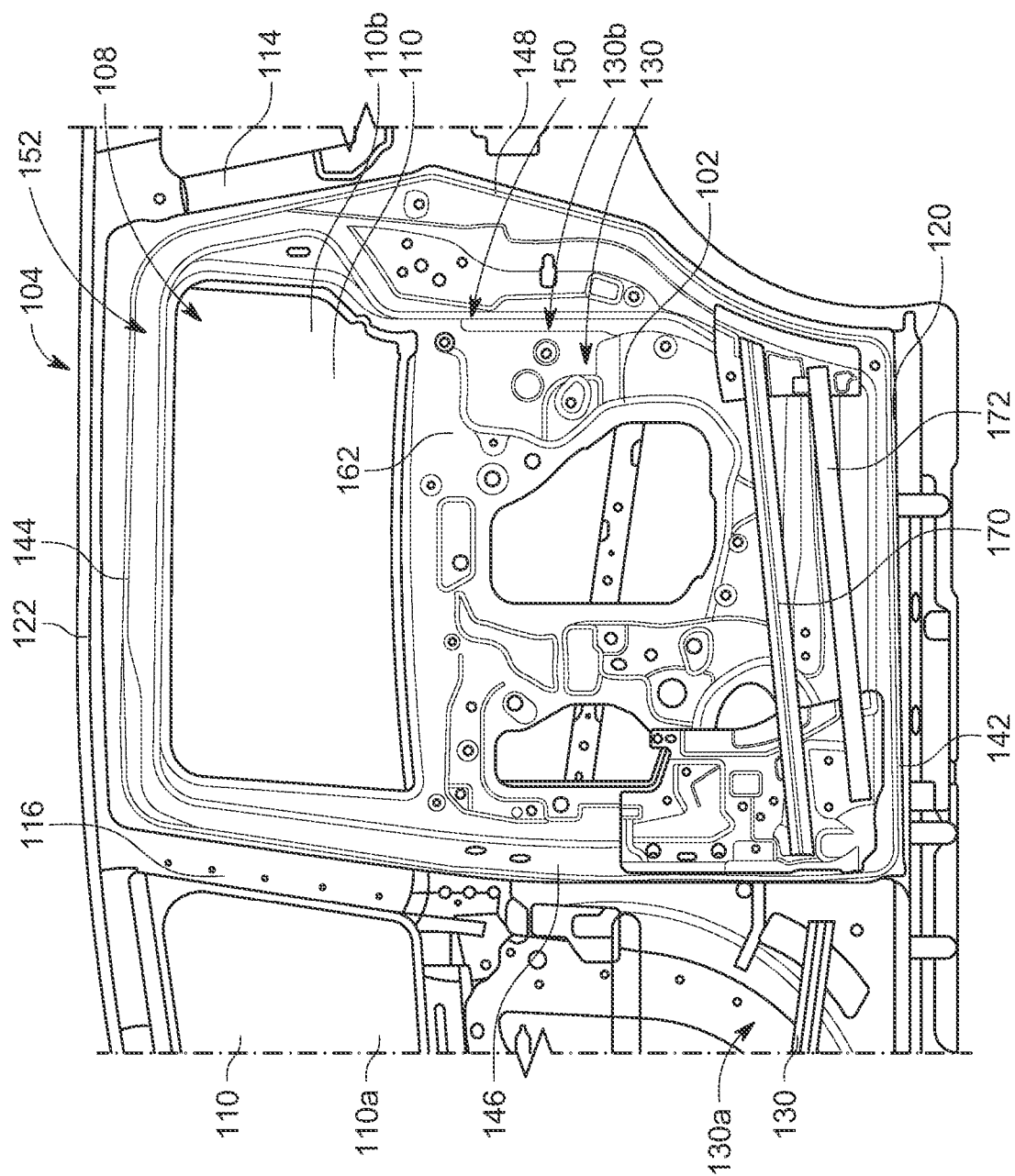
FIG. 2 is a perspective view of a rear door of the vehicle in accordance with one embodiment of the present disclosure.

As shown in FIG. 1 and FIG. 2, the vehicle body 104 defines a passenger compartment 108 and a plurality of access openings 110, for example, side front access openings 110a and side rear access openings 110b, to enable an entry and exit of the passenger from the passenger compartment 108. Further, the vehicle body 104 includes a pair of front pillars 112, also referred to as 'A' pillars, a pair of rear pillars 114, also referred to as 'C' pillars, and a pair of intermediate pillars 116, also referred to as 'B' pillars and arranged between the front pillars 112 and the rear pillars 114. It may be appreciated that one front pillar 112, one rear pillar 114, and one intermediate pillar 116 are arranged on a left side of the vehicle body 104 and one front pillar 112, one rear pillar 114, and one intermediate pillar 116 are arranged on a right side of the vehicle body 104. Further, each of the pillars 112, 114, 116 extend vertically from a floor 120 of the vehicle body 104 to a top or a roof 122 of the vehicle body 104 such that the access openings 110 are defined between two adjacently disposed pillars 112, 114, 116.

Additionally, the vehicle 100 includes a plurality of doors 130 movably attached to the vehicle body 104 for selectively closing the plurality of access openings 110. For example, a pair of front side doors 130*a* are pivotally coupled to the front pillars 112, while a pair of rear side doors 130*b* are movably or slidably coupled to the vehicle body 104 to selectively allow access of rear portion of the passenger compartment 108 through the side rear access openings 110*b*. Although, the rear side doors 130*b* are contemplated as sliding doors, it may be appreciated that the rear side doors 130*b* may be pivotable or hinged doors. In other embodiments, the front doors 103*b* may be movably or slidably coupled to the vehicle body 104.

As best shown in FIG. 2, the rear side door 130*b* includes a lower end 142 adapted to be arranged proximate to the floor 120 of the vehicle body 104, an upper end 144 adapted to be arranged proximate to the top 122 of the vehicle body 104, a first lateral side 146 arranged proximate to the front side door 130*a* of the vehicle body 104, and a second lateral side 148 arranged proximate to a rear of the vehicle body 104 relative to the first lateral side 146. Further, the rear side door 130*b* includes a frame portion 150 extending from the lower end 142 towards the upper end 144, and a window portion 152 defining a window of the rear side door 130*b* arranged proximate to the upper end 144. Moreover, the frame portion 150 includes an outer plate 160 (shown in FIG. 3 and FIG. 4) disposed on an exterior side of the vehicle 100, and an inner plate 162 arranged on an interior side of the vehicle 100 and defining a space 164 (best shown in FIG. 3 and FIG. 4) therebetween.

Additionally, the rear side door 130*b* includes at least one beam arranged inside the space 164 and extending in a longitudinal direction of the vehicle 100. In an exemplary embodiment, a beam 172 (e.g., a first beam) is arranged below the window portion 152 and proximate to the lower end 142 of the rear side door 130*b*. Additionally, or optionally, the rear side door 130*b* may include another beam 170 (e.g., a second beam) that is arranged proximate to the window portion 152 relative to the first beam 172, and therefore is arranged between the first beam 172 and the window portion 152 in a vertical direction.

Figure 3:
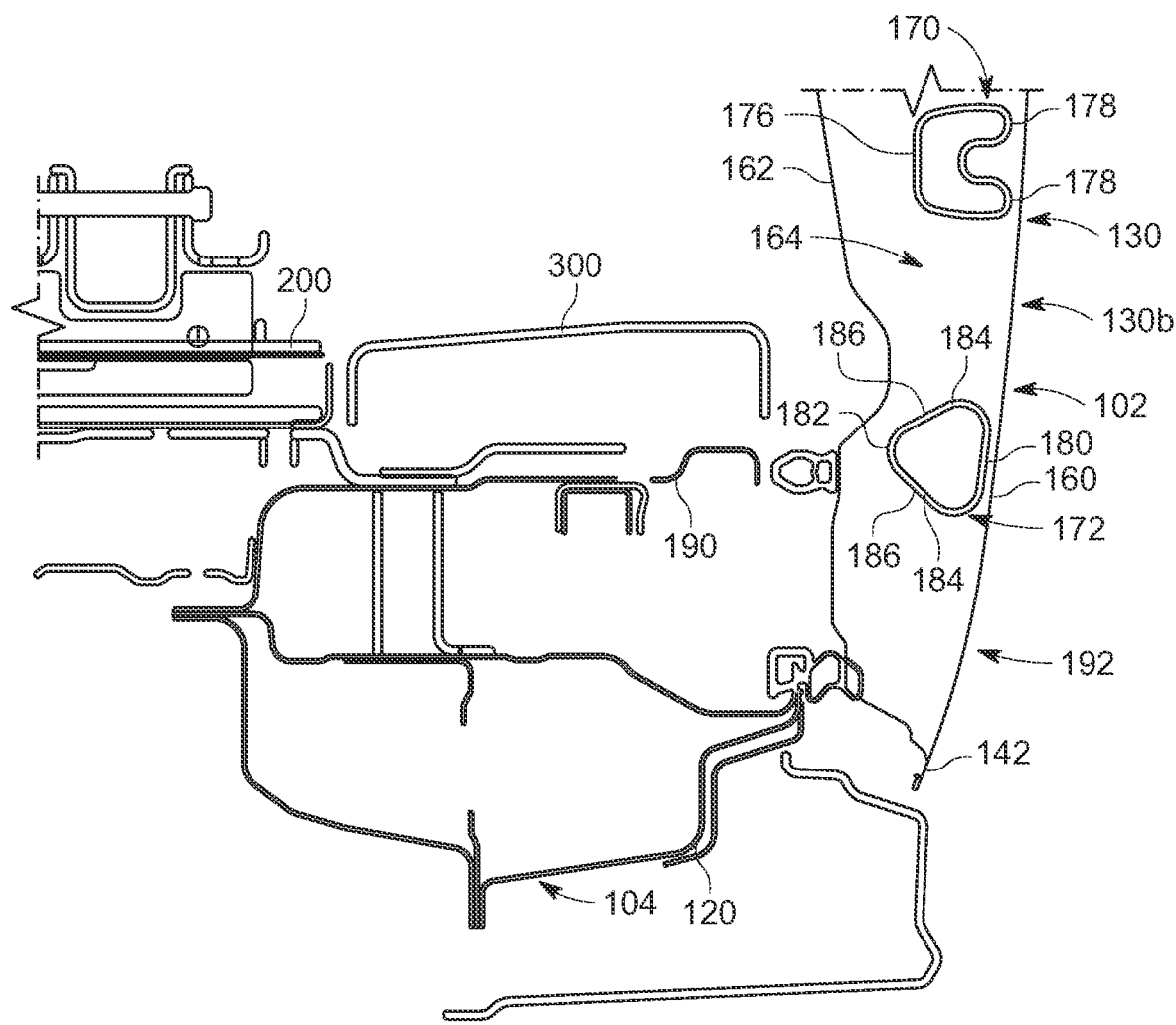
FIG. 3 is a schematic cross-section view of a side structure of the vehicle in accordance with one embodiment of the present disclosure.

As best shown in FIG. 3, the beam 172 includes a substantially triangular cross-section when viewed from a lateral side, for example, a first lateral side 146 of the rear side door 130*b*. The beam 172 includes a base portion 180 arranged proximate to the outer plate 160, and a vertex portion 182 disposed opposite to the base portion 180 and arranged proximate to the inner plate 162 of the rear side door. A pair of sidewalls 184 are arranged opposite to each other and extends from the vertex portion 182 towards the base portion 180 in a horizontal direction. As shown, the vertex portion 182 is an arcuate vertex portion and includes a substantially convex shape, therefore, the beam 172 includes a curved top having a convex shape. Each sidewall 184 includes a ramp portion 186 subtending an acute angle therebetween. In some embodiments, the ramp portion 186 facilitates a trapping of the beam 172 on a side sill 190 arranged proximate to the floor 120 of the vehicle body 104, enabling an improved load transfer from the rear side door 130*b* to the internal structures of the vehicle 100.

Figure 4:
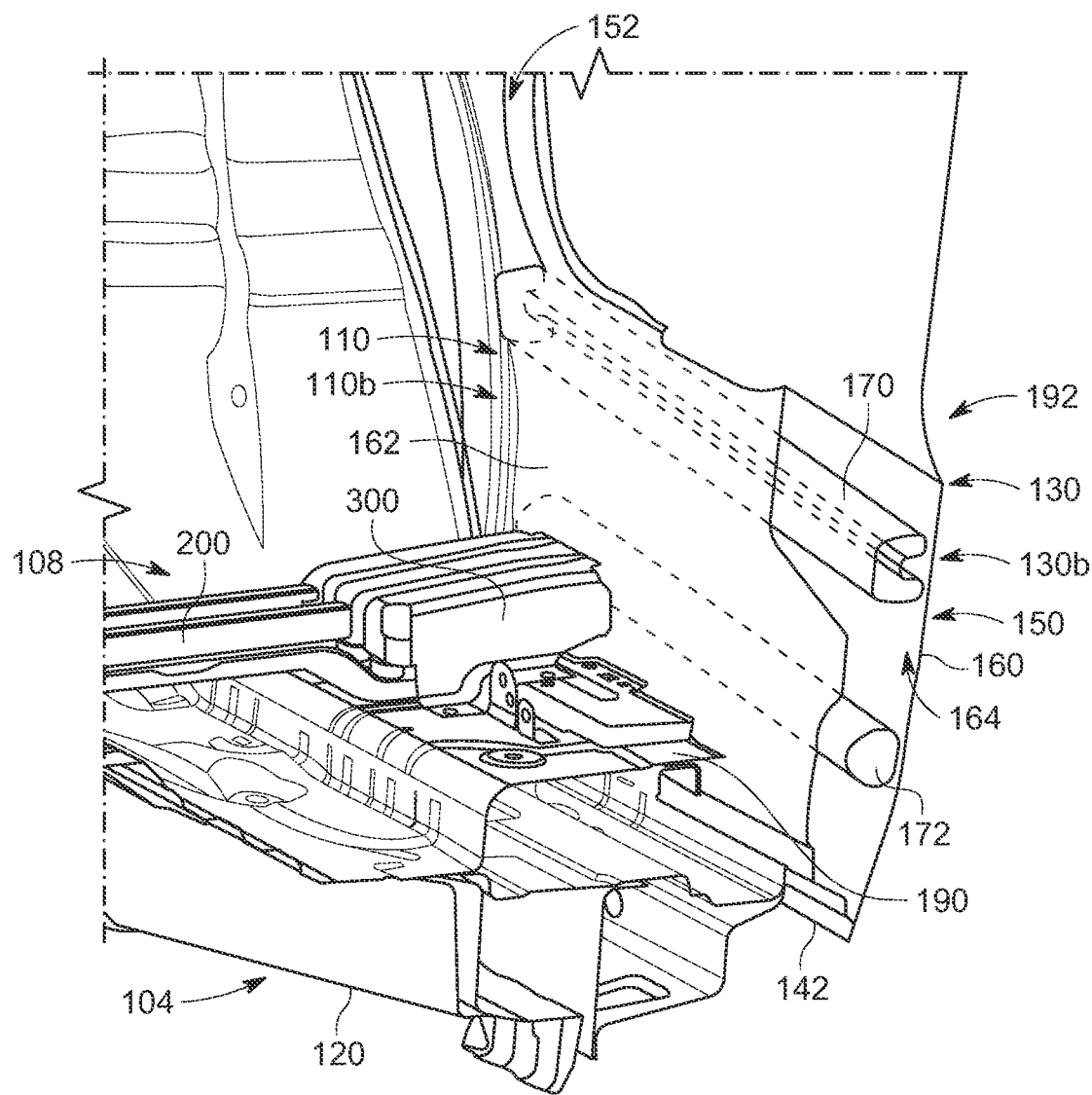
FIG. 4 is a perspective view of a portion of an interior of the vehicle with some of the component removed and depicting a bracket and a seat support structure of the vehicle, in accordance with one embodiment of the present disclosure.

Further, referring to FIG. 3 and FIG. 4, the vehicle 100 includes a seat support structure 200 arranged inside the passenger compartment 108 and supported by the floor 120 of the vehicle body 104. The seat support structure 200 extends in a lateral direction of the vehicle 100, and supports at least one seat, for example, a rear seat, of the vehicle 100. In some embodiments, the seat support structure 200 may include a seat rail or a seat bar. In other embodiments, the seat support structure may include a frame structure that is attached to the floor and then supports the seat itself. Accordingly, the seat support structure 200 may extend between two rear access openings 110*b* in a width direction of the vehicle body 104.

Moreover, the vehicle 100 may have a side sill structure that includes a bracket 300 arranged or disposed inside the passenger compartment 108 and supported on the side sill 190 of the vehicle 100. The bracket extends 300 vertically upwardly from the side sill 190 and is arranged between the seat support structure 200 and the rear side door 130*b* in the lateral direction of the vehicle 100. In some embodiments, the beam 172 is arranged relative to the bracket 300 and the side sill 190 such that beam 172 is arranged between the side sill 190 and an upper end of the bracket 300 in the vertical direction. Additionally, or optionally, the bracket 300 may extend in the vertical direction such that at least a portion of the bracket 300 is arranged between the first beam 172 and the second beam 170. The seat support structure 200, the bracket 300, the side sill 190, and the rear side door 130*b* together defines a side impact structure 192 (also referred to as a side structure 192) for the vehicle that facilitates and enables an improved absorption and transfer of the impact energy to various components of the vehicle 100 and the floor 120 of the vehicle body 104 upon a side impact on the vehicle 100 by an external structure. In other embodiments, the side structure 192 may include the front side door 130*a* rather than the rear side door 130*b*.

Figure 5:
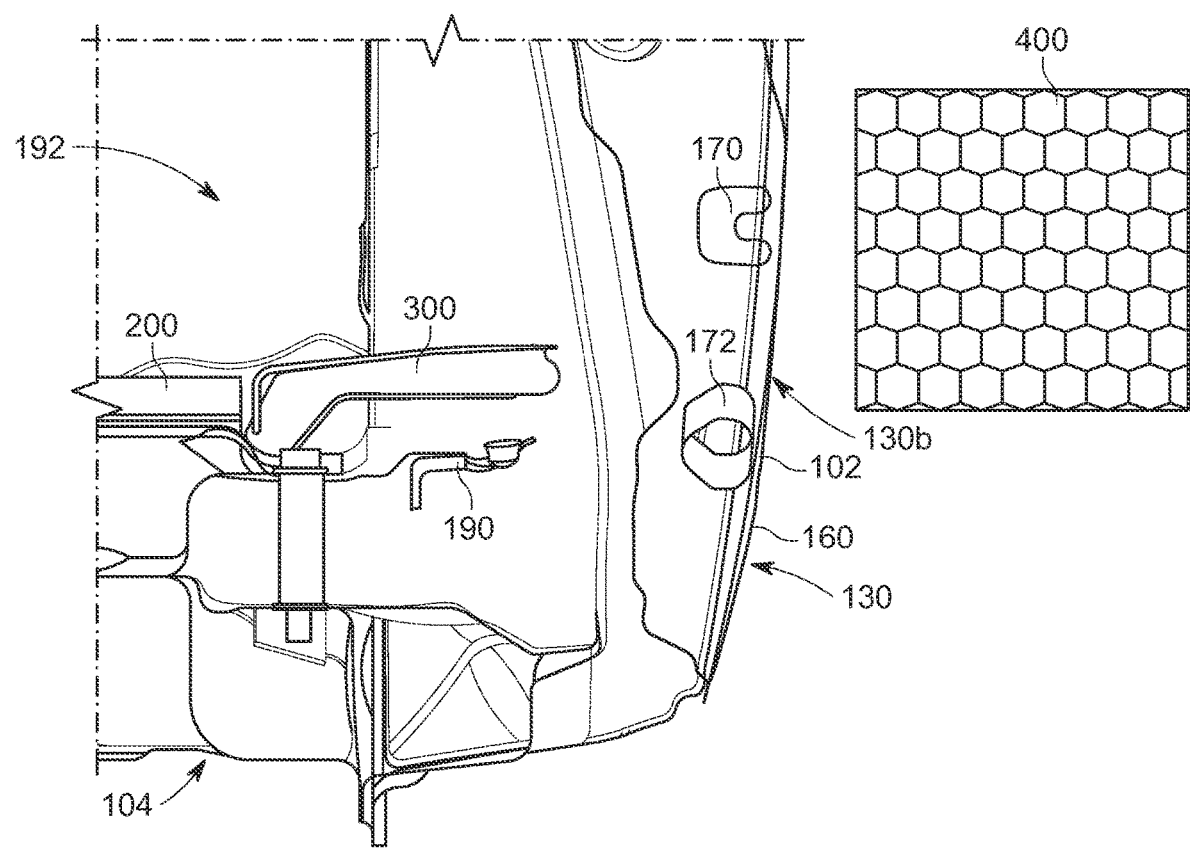
FIGS. 5-7 depicts an interaction of a beam with the bracket during a side impact event on the rear side door, in accordance with one embodiment of the present disclosure.
Figure 6:
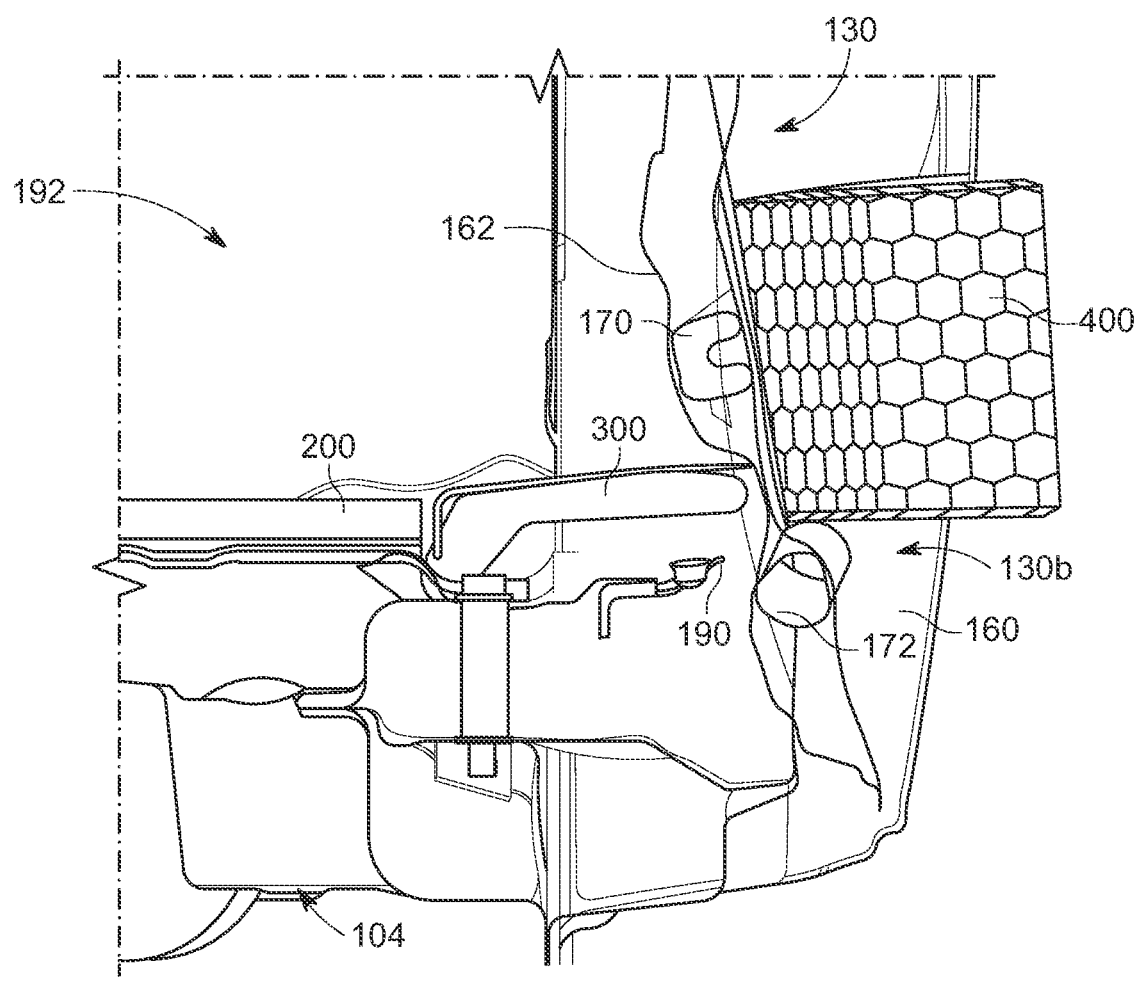
Figure 7:
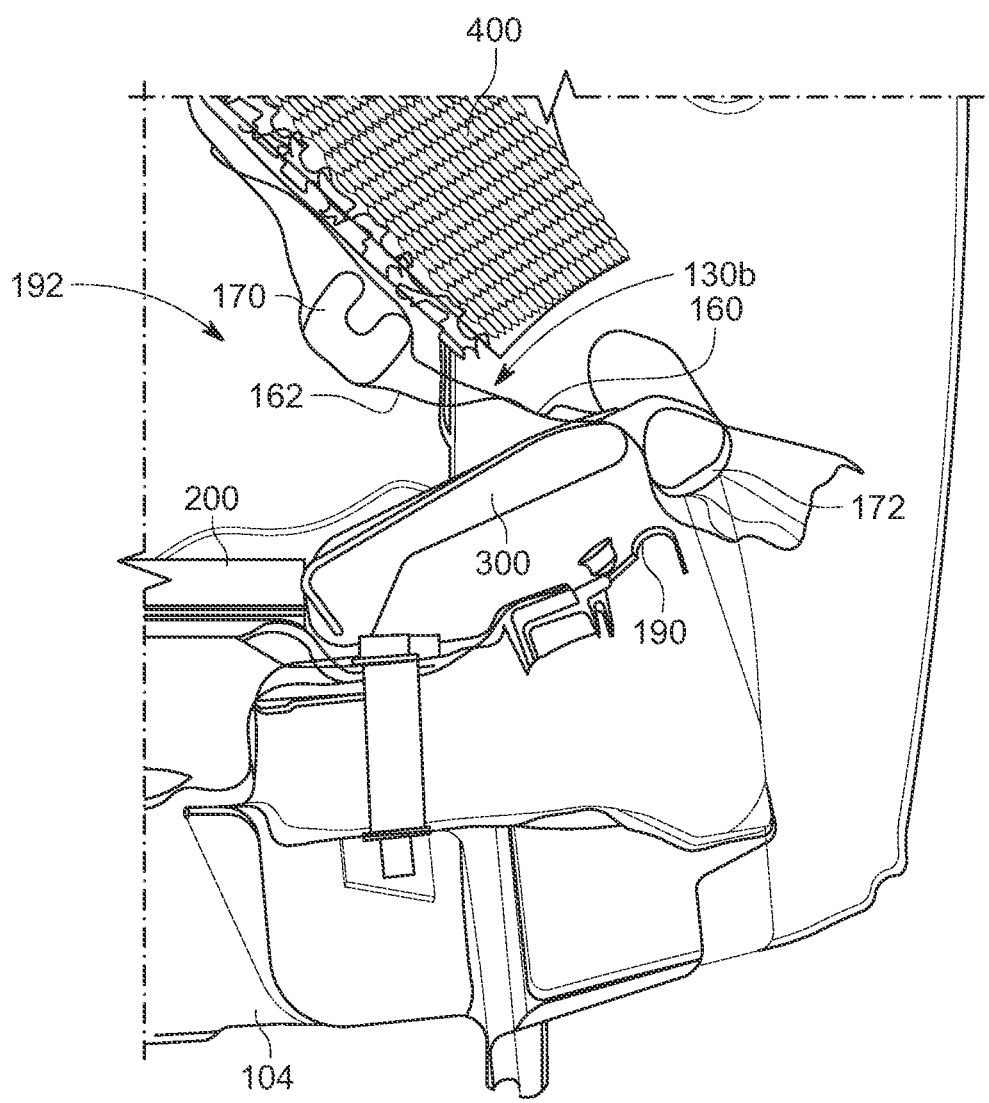

Referring to the FIGS. 5 to 7, a movement of the various components, for example, the beam 172 of the rear side door 130*b* and the bracket 300, during a side impact event on the vehicle 100 is described. FIG. 5 depicts a position and a relative orientation of the beam 172 and the rear side door 130*b* with respect to the bracket 300 and the side sill 190 when an external structure 400 is about to make contact with the outer plate 160 of the rear side door 130*b*. At this moment, the beam 172 is arranged in its original position in the rear side door 130*b* and the bracket 300 is arranged in its original position on the side sill 190.

As the external structure 400 impacts the outer plate 160 and moves inwardly, as shown in FIG. 6, the outer plate 160 deforms and subsequently, the inner plate 162 and the vertex portion 182 of the beam 172 engage the side sill 190. Thereafter, upon further movement of the external structure 400, as shown in FIG. 7, the rear side door 130*b* bends further inwardly, causing the ramp portion 186 of the beam 172 to connect and engage with an end portion of the side sill bracket 300, facilitating a trapping of the beam 172 below the side sill bracket 300. Further, due to the inward bending of the rear side door 130*b*, the bracket 300 is also dislocated from its original position as one end of the bracket 300 engages the seat support structure 200 and an opposite end of the bracket 300 moves vertically upwardly, but the ramp portion 186 of the beam 172 remains engaged with the end portion of bracket 300. Therefore, the inner plate 162 of the lower end 142 of the rear door 130*b* stays engaged with the side sill 190 during the side impact event.

In this manner, a load path is established between the beam 172, the inner plate 162, the side sill 190, and the bracket 300, and the impact energy is distributed to the bracket 300 through the beam 172, and the side sill 190. Accordingly, the impact of the external structure 400 is distributed and absorbed more effectively. Also, during the side impact event, the beam 172 is trapped below the bracket

300, thus, although the door deforms, the lower end 142 of the rear door 130*b* stays engaged with the side sill 190 of the vehicle, which reduces overall crash barrier intrusion into the vehicle 100.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

The invention claimed is:

1. A side structure for a vehicle having a vehicle body and a door coupled to the vehicle body, the side structure comprising:
   a beam attached to the door and extending in the longitudinal direction of the door and arranged proximate to a lower end of the door in a vertical direction;
   a side sill arranged proximate to a floor of the vehicle body;
   a seat support structure arranged inside the vehicle body configured to support at least one seat and coupled to the floor of the vehicle body; and
   a bracket arranged inside the vehicle body and disposed between the seat support structure and the door in a lateral direction, the bracket adjacently aligned with the seat support structure and mounted on the side sill, wherein the beam is configured to engage with the bracket and the bracket is configured to engage with the seat support structure during a deformation of the door.

2. The side structure of claim 1, wherein the beam includes an arcuate vertex portion arranged proximate to an inner side of the door and a base portion arranged proximate to an outer side of the door.

3. The side structure of claim 2, wherein the beam includes a pair of sidewalls arranged opposite to each other and extending from the base portion to the arcuate vertex portion, wherein each sidewall includes a ramp portion extending from the arcuate vertex portion towards the base portion.

4. The side structure of claim 3, wherein the ramp portion of the beam is configured to engage with an end portion of the bracket during the deformation of the door.

5. The side structure of claim 1, wherein the seat support structure comprising at least one of a seat rail or a seat bar.

6. The side structure of claim 1, wherein the beam is arranged proximate to the bracket in the vertical direction relative to the lower end of the door.

7. The side structure of claim 1, wherein the bracket includes a first end portion facing the door, a second end portion opposite the first end portion facing an end of the seat support structure, and a top that extends towards the top of the vehicle body from the side sill.

8. A vehicle comprising:
   a vehicle body having a floor, a top, and defining at least one access opening at a side of the vehicle body;
   a door coupled to the vehicle body and adapted to selectively cover the access opening of the vehicle body, the door includes a first end arranged proximate to the floor of the vehicle body and a second end arranged proximate to the top of the vehicle body, the door includes a first beam extending in the longitudinal direction of the door and arranged proximate to the first end of the door in a vertical direction;
   a seat support structure arranged inside the vehicle body and coupled to the floor of the vehicle body;
   a side sill arranged proximate to the floor of the vehicle body; and
   a bracket arranged inside the vehicle body and disposed between the seat support structure and the door in a lateral direction, the bracket adjacently aligned with the seat support structure and mounted on the side sill, wherein the first beam is configured to engage with the bracket and the bracket is configured to engage with the seat support structure during a deformation of the door.

9. The vehicle of claim 8, wherein the first beam includes a substantially triangular cross-section having a vertex portion arranged proximate to an inner side of the door and a base portion arranged proximate to an outer side of the door.

10. The vehicle of claim 9, wherein the first beam includes a pair of sidewalls arranged opposite to each other and extending from the base portion to the vertex portion, wherein each sidewall includes a ramp portion extending from the vertex portion towards the base portion.

11. The vehicle of claim 10, wherein the ramp portion of the first beam is configured to engage with an end portion of the bracket during the deformation of the door.

12. The vehicle of claim 8, wherein the first beam is arranged proximate to the bracket in the vertical direction relative to the first end of the door.

13. The vehicle of claim 8, wherein the door includes a second beam extending in a longitudinal direction of the door and arranged between the first beam and the second end of the door in a vertical direction, wherein at least a portion of the bracket is arranged between the first beam and the second beam in the vertical direction.

14. The vehicle of claim 8, wherein the bracket includes a first end portion facing the door, a second end portion opposite the first end portion facing an end of the seat support structure, and a top that extends towards the top of the vehicle body from the side sill.

15. A side structure for a vehicle having a vehicle body, the side structure comprising:
   a door coupled to the vehicle body, the door includes a first end arranged proximate to a floor of the vehicle body and a second end arranged proximate to a top of the vehicle body, the door includes a first beam extending in the longitudinal direction of the door and arranged proximate to the first end of the door in a vertical direction, wherein the first beam includes a vertex portion arranged proximate to an inner side of the door and a base portion arranged proximate to an outer side of the door;
   a side sill arranged proximate to the floor of the vehicle body;
   a seat support structure comprising a seat rail arranged inside the vehicle body and coupled to a floor of the vehicle body; and
   a bracket arranged inside the vehicle body and disposed between the seat rail and the door in a lateral direction, the bracket adjacently aligned with the seat rail and mounted on the side sill, wherein the first beam is configured to engage with the bracket and the bracket is configured to engage with the seat support structure during a deformation of the door.

16. The side structure of claim 15, wherein the first beam includes a pair of sidewalls arranged opposite to each other and extending from the base portion to the vertex portion, wherein each sidewall includes a ramp portion extending from the vertex portion towards the base portion.

17. The side structure of claim 16, wherein the ramp portion of the first beam is configured to engage with an end portion of the bracket during the deformation of the door.

18. The side structure of claim 15, wherein the first beam is arranged proximate to the bracket in the vertical direction relative to the first end of the door.

19. The side structure of claim 15, wherein the door includes a second beam extending in a longitudinal direction of the door and arranged between the first beam and the second end of the door in a vertical direction, wherein at least a portion of the bracket is arranged between the first beam and the second beam in the vertical direction.

20. The side structure of claim 15, wherein the bracket includes a first end portion facing the door, a second end portion opposite the first end portion facing an end of the seat support structure, and a top that extends towards the top of the vehicle body from the side sill.

\* \* \* \* \*